(12) United States Patent
Adachi et al.

(10) Patent No.: US 8,966,212 B2
(45) Date of Patent: *Feb. 24, 2015

(54) MEMORY MANAGEMENT METHOD, COMPUTER SYSTEM AND COMPUTER READABLE MEDIUM

(75) Inventors: Masahiko Adachi, San Francisco, CA (US); Hiroyasu Nishiyama, Kawasaki (JP); Motoki Obata, Toda (JP)

(73) Assignee: Hitachi, Ltd., Tokyo (JP)

( * ) Notice: Subject to any disclaimer, the term of this patent is extended or adjusted under 35 U.S.C. 154(b) by 442 days.

This patent is subject to a terminal disclaimer.

(21) Appl. No.: 13/382,392

(22) PCT Filed: Jul. 22, 2010

(86) PCT No.: PCT/JP2010/062339
§ 371 (c)(1),
(2), (4) Date: Apr. 18, 2012

(87) PCT Pub. No.: WO2011/027626
PCT Pub. Date: Mar. 10, 2011

(65) Prior Publication Data
US 2012/0198184 A1 Aug. 2, 2012

(30) Foreign Application Priority Data
Sep. 1, 2009 (JP) .................. 2009-201383

(51) Int. Cl.
*G06F 12/02* (2006.01)
*G06F 17/30* (2006.01)

(52) U.S. Cl.
CPC .......... *G06F 12/0253* (2013.01); *G06F 12/023* (2013.01); *G06F 17/30085* (2013.01); *G06F 2212/1044* (2013.01)
USPC ..... 711/170; 711/165; 711/154; 711/E12.002

(58) Field of Classification Search
CPC ............ G06F 12/0253; G06F 12/0261; G06F 17/30085; G06F 12/023; G06F 17/30138

USPC ...................... 711/112, 154, 166, 165, E12.02
See application file for complete search history.

(56) References Cited

U.S. PATENT DOCUMENTS

| 7,580,961 B2 * | 8/2009 | Todd et al. .............................. 1/1 |
| 7,793,049 B2 * | 9/2010 | Cain et al. ..................... 711/133 |

(Continued)

FOREIGN PATENT DOCUMENTS

| JP | 2003-323337 A | 11/2003 |
| JP | 2007-157131 A | 6/2007 |

(Continued)

OTHER PUBLICATIONS

Pizlo et al, "Real-Time Java Scoped Memory: Design Patterns and Semantics", IEEE International Symposium on Object-Oriented Read-Time Distributed Computing, 2004.*
Akihiko Kusanagi, "Real-Time Java—from Implementation to Enterprise", Nov. 2, 2007, pp. 1-42.

(Continued)

*Primary Examiner* — Pierre-Michel Bataille
(74) *Attorney, Agent, or Firm* — Volpe and Koenig, P.C.

(57) ABSTRACT

It is provided a memory management method for releasing an unnecessary area in a memory area used by a program stored in the memory and executed by the computing device. The memory management method including the step of: setting in the memory, a first memory area which is used to execute the program; setting in the memory, a second memory area which can be operated by the program; setting a utilized area in the second memory area based on an instruction from the program; storing objects including data in the utilized area of the second memory area based on an instruction from the program; determining whether the program uses the objects stored in the utilized area within the second memory area; and releasing, by the computing device, the utilized area occupied by an object that is not used by the program among the objects stored in the utilized area.

14 Claims, 12 Drawing Sheets

(56) References Cited

U.S. PATENT DOCUMENTS

| | | | |
|---|---|---|---|
| 8,214,620 B2 * | 7/2012 | Watanabe et al. | 711/171 |
| 2007/0136402 A1 | 6/2007 | Grose et al. | |
| 2009/0037684 A1 | 2/2009 | Obata et al. | |
| 2009/0083509 A1 | 3/2009 | Johnson | |
| 2010/0077170 A1 * | 3/2010 | Adachi et al. | 711/165 |
| 2010/0250629 A1 | 9/2010 | Obata et al. | |

FOREIGN PATENT DOCUMENTS

| | | |
|---|---|---|
| JP | 2009-037547 A | 2/2009 |
| JP | 2010-073127 A | 4/2010 |
| JP | 2010-225033 A | 10/2010 |
| JP | 2011-053862 A | 3/2011 |
| JP | 2011-175333 A | 9/2011 |

* cited by examiner

MEMORY MANAGEMENT METHOD, COMPUTER SYSTEM AND COMPUTER READABLE MEDIUM

BACKGROUND OF THE INVENTION

This invention relates to a memory management method, a computer system, and a computer-readable memory, and more particularly, to a technology of controlling the utilization efficiency of a memory by memory management based on whether or not data stored in the memory is necessary to the execution of a program.

In developing a computer program, processing of allocating or releasing a memory area that is used by the program is known to be prone to program bugs such as reference to invalid areas. In large-scale program development, in particular, it is becoming difficult for a programmer to have a complete grasp on allocation and release processing of every memory area.

As a solution to this, using a garbage collector which automates memory management in a program can be given. Java, one of language processors having a memory management function that utilizes a garbage collector, is equipped with means for memory area allocation but uses a garbage collector for release. A Java program developer therefore explicitly specifies memory area allocation but does not need to write memory area release processing. The memory area release function executed by a garbage collector is garbage collection (hereinafter, referred to as "GC").

GC is a function of picking out data (an object) that is no longer needed among memory areas dynamically allocated by a program, and automatically releasing an area that has been occupied by the object. A commonly practiced GC method is to suspend all running threads of a Java program while unnecessary data is collected and the memory area is released.

In recent years, a drop in response performance due to lengthy suspension by GC has become a problem. Methods proposed or developed to solve the problem include the Java Virtual Machine which has a heap memory that is not counted as a target of GC (hereinafter, referred to as external heap) besides a heap memory that is counted as a target of GC (see, for example, JP 2009-037547 A).

The conventional heap memory in a Java virtual machine is subject to memory management by GC. The external heap, on the other hand, is an area that allows for memory area management by a programmer. Specifically, the programmer writes, in a source code, instructions to allocate a memory area from an external heap, to generate an object in the allocated memory area, and to release the memory area. The external heap is thus treated as a heap memory that can be managed by the program.

In the related art example described above, the memory area in the external heap allocated by the program is defined as an external memory area. The external memory area keeps storing an object generated by the program until the processing of releasing the external memory area is executed. The mixed presence of objects necessary and unnecessary to execute the Java program in an external memory area lowers the utilization efficiency of the external memory area. The resultant problem is that a longer interval between the allocation and release of an external memory area could mean increase of unnecessary objects within the external memory area and consequently a higher chance of the external memory area dropping in utilization ratio.

SUMMARY OF THE INVENTION

This invention has been made in view of the problem described above, and an object of this invention is therefore to use external memory areas efficiently in a processing system that has an external heap by managing a memory based on whether or not data that is stored in the external heap is necessary to execute a program.

The representative one of inventions disclosed in this application is outlined as follows. There is provided a memory management method for releasing an unnecessary area in a memory area used by a program that is stored in the memory and executed by the computing device in a computer system having a computing device and a memory. The memory management method includes the step of: setting, by the computing device, in the memory, a first memory area which is used to execute the program; setting, by the computing device, in the memory, a second memory area which can be operated by the program; setting, by the computing device, a utilized area in the second memory area based on an instruction from the program; storing, by the computing device, objects including data in the utilized area of the second memory area based on an instruction from the program; determining, by the computing device, whether the program uses the objects stored in the utilized area within the second memory area; and releasing, by the computing device, the utilized area occupied by an object that is not used by the program among the objects stored in the utilized area.

According to this invention, the utilization efficiency of areas in an external heap is thus improved.

DETAILED DESCRIPTION OF THE PREFERRED EMBODIMENTS

First Embodiment

Figure 1:
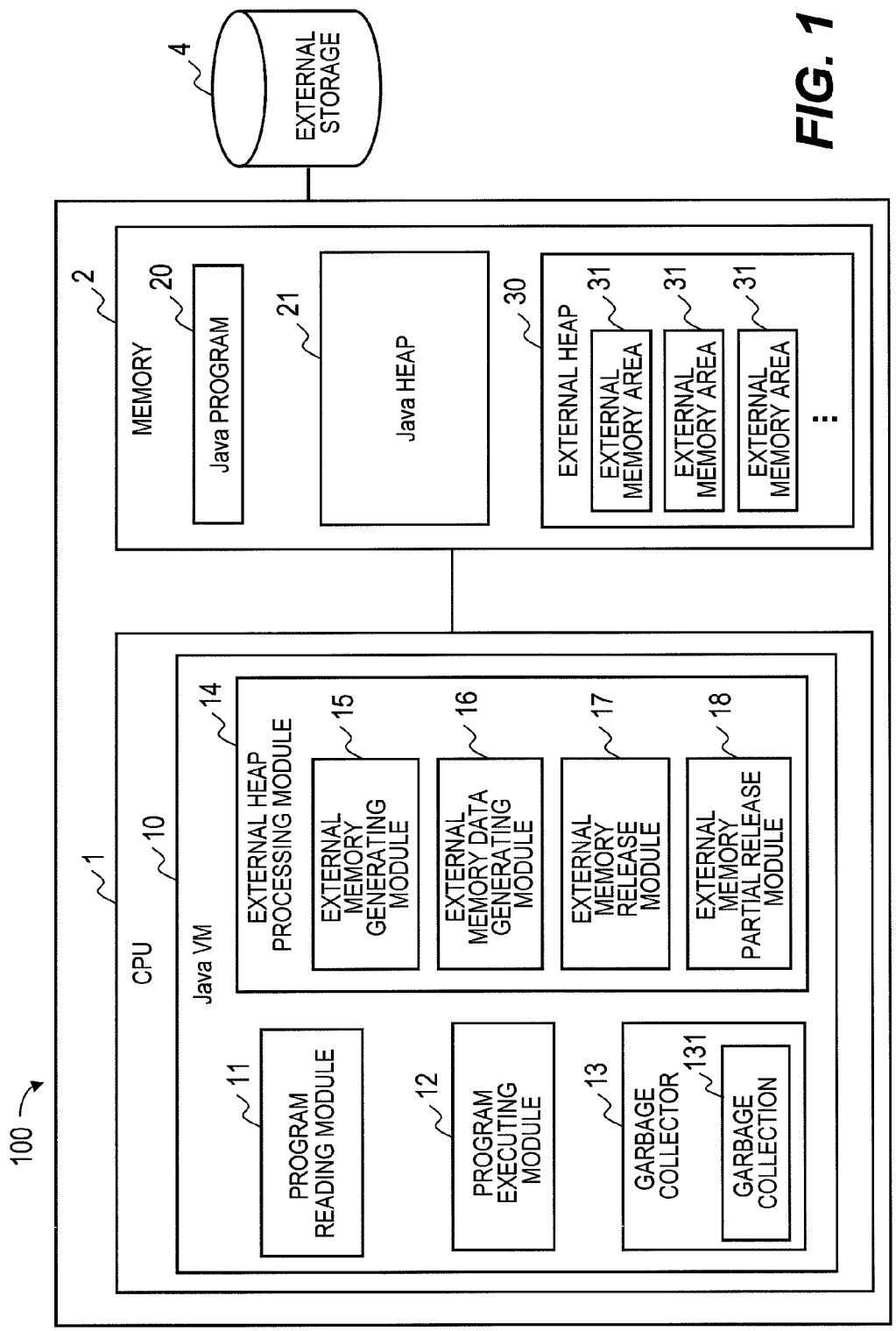
FIG. 1 is a block diagram illustrating the configuration of a computer according to a first embodiment of this invention.

An embodiment of this invention is described below with reference to the accompanying drawings. FIG. 1 is a block diagram illustrating the configuration of a computer according to a first embodiment of this invention. A computer 100 of FIG. 1 includes a CPU (or processor) 1, a memory (main memory) 2, and external storage 4. In the computer 100, a Java virtual machine (VM) 10 includes an external heap 30, and a Java heap 21 and an external heap 30 are set in the memory 2. FIG. 1 is a configuration diagram illustrating the configuration of the Java virtual machine 10 and the configurations of the Java heap 21 and the external heap 30.

Inside the Java virtual machine 10, a program reading module 11, which reads a Java program 20 stored in the memory 2, a program executing module 12, which executes the program, a garbage collector 13, which performs garbage collection (hereinafter, referred to as "GC") processing 131 as memory operation, and an external heap processing module 14, which performs external heap operation, operate on the CPU 1.

The garbage collector 13 performs GC operation on the Java Heap 21 allocated in the memory 2 by the Java VM 10.

The external heap processing module 14 operates the external heap 30. The external heap 30 is a memory area different from the Java heap 21, which is a memory area in the memory 2 that is used by the Java virtual machine 10.

The external heap processing module 14 includes an external memory generating module 15, which sets an external memory area 31 as a storage area (partial area) in the external heap 30, a data generating module 16, which writes data in the external memory area 31, an external memory release module 17, which releases the external memory area 31 that is no longer necessary, and an external memory partial release module 18. The external heap processing module 14 uses these processing modules to generate the external memory area 31 in the external heap 30, write data in the external memory area 31, and release the external memory area 31 when the external memory area 31 becomes unnecessary.

The external memory partial release module 18 releases, as will be described later, an area occupied by data (an object) that is within the external memory area 31 of the external heap 30 and that is not necessary for the subsequent execution of the Java program 20.

The java heap 21 is set in the memory 2 by the Java virtual machine 10. The external heap 30 is set by the external heap processing module 14. The external heap processing module 14 executes an external memory generation statement (201 of FIG. 2) written in the Java program 20 to generate the external memory area 31 in the external heap 30. The Java program 20 may be stored in the external storage 4 instead of the memory 2.

The Java heap 21 is a memory area that the Java VM 10 manages and uses in executing the Java program 20. The Java heap 21 is a first memory area which can be operated by the Java VM 10 and cannot be operated by the Java program 20.

The external heap 30 is a second memory area which can be operated by the Java program 20 as described above. The Java program 20 gives instructions to generate (allocate) the external memory area 31 in the external heap 30, to write an object in the external memory area 31, and to release or partially release the external memory area 31. The external heap processing module 14 receives these instructions from the Java program 20 and executes the instructions.

In other words, the external memory area 31 is a unit segment by which the external heap 30 is used (utilized area), and the Java program 20 uses the external heap 30 by generating one or more external memory areas 31 and writing objects in the generated external memory areas 31.

Java virtual machine 10, which is drawn inside the CPU 1 in FIG. 1, is actually loaded onto the memory 2 and the CPU 1 reads the processing modules of the Java virtual machine 10 as the need arises to execute processing of the respective processing modules. Java virtual machine 10 is provided as a program stored in a non-transitory computer-readable medium of the external storage 4. The program can be stored in any type of computer-readable medium.

Figure 2:
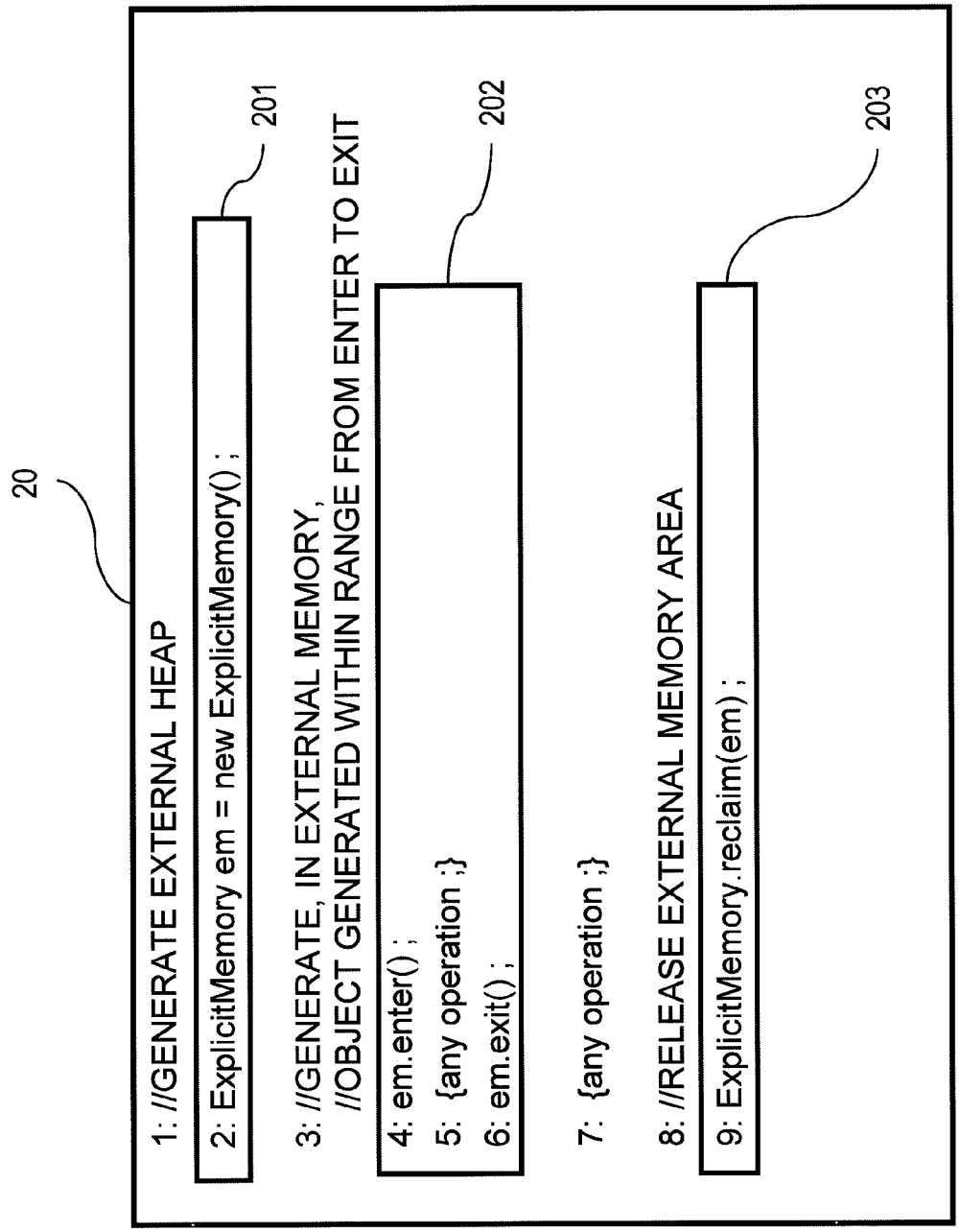
FIG. 2 is an explanatory diagram illustrating example of the Java program containing statements for the generation of the external memory area, the generation of data in the external memory area, and the release of the external memory area which are executed by the external heap processing module according to the first embodiment of this invention.

FIG. 2 illustrates an example of the Java program 20 containing statements for the generation of the external memory area 31, the generation of data in the external memory area 31, and the release of the external memory area 31 which are executed by the external heap processing module 14. In FIG. 2, the statement 201 in the second line is a statement for generating the external memory area 31, and data is generated in the allocated external memory area 31 through processing 202, which is written in the fourth (an enter method) to sixth (an exit method) lines. A statement 203 in the ninth line is a statement for releasing the external memory area 31.

Figure 3:
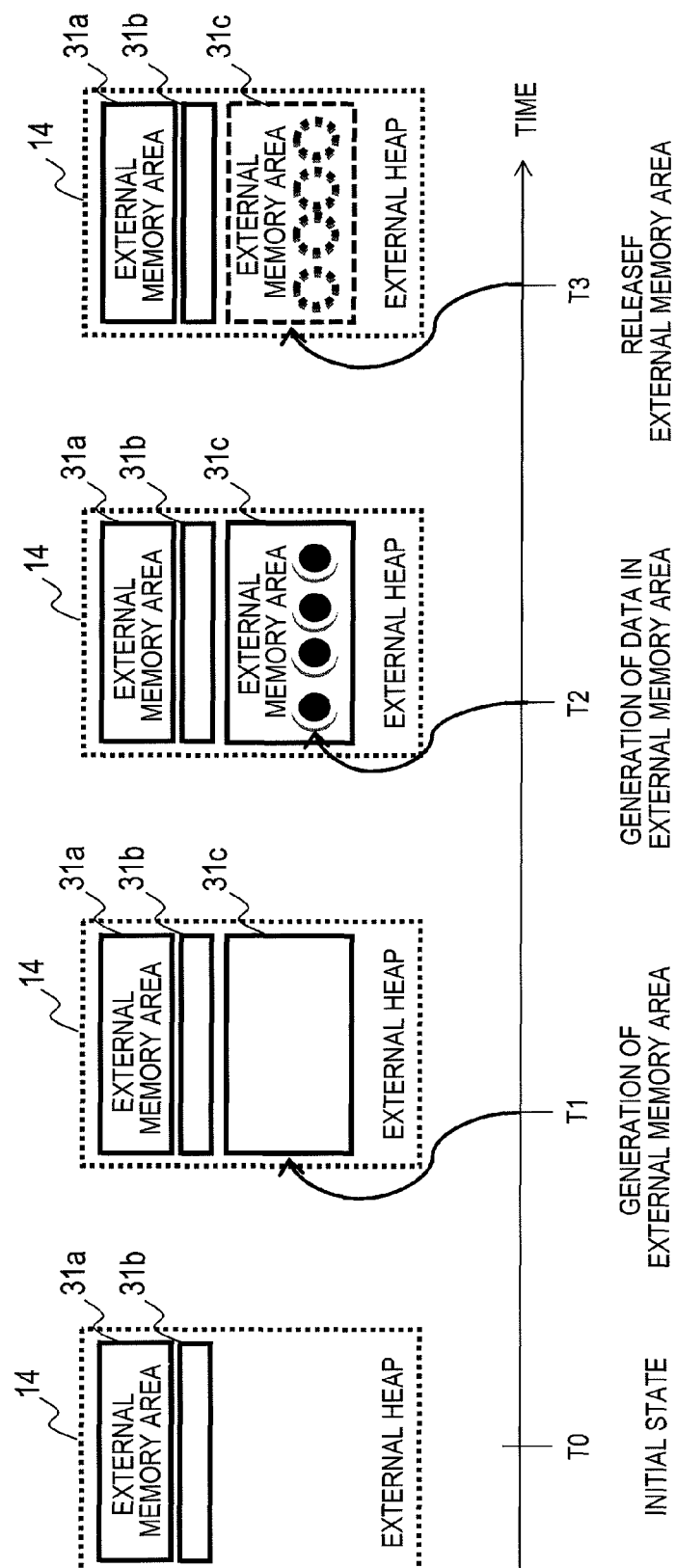
FIG. 3 is an explanatory diagram illustrating an example of transition in the state of the external memory area that occurs upon using the external heap according to the first embodiment of this invention.

FIG. 3 illustrates an example of transition in the state of the external memory area 31 that occurs when the external heap processing module 14 uses the external heap 30. At a time (T0), the external memory areas 31a and 31b are present in the external heap 30. At a time (T1), during the execution of the Java program 20, the external heap processing module 14 generates an external memory area 31c following an instruction to generate the new external memory area 31.

At a time (T2) in FIG. 3, data is generated in the external memory area 31c. The data is generated in response to an instruction from the running Java program 20 to generate data in the allocated external memory area 31c. At a time (T3), the Java program 20 issues an instruction to release the external memory area 31, and the external memory release module 17 of the external heap processing module 14 releases the relevant external memory area 31c from the external heap 30.

As in this example, the Java program 20 manages the external heap 30 and the external memory area 31 with the functions of the external heap processing module 14.

Figure 4:
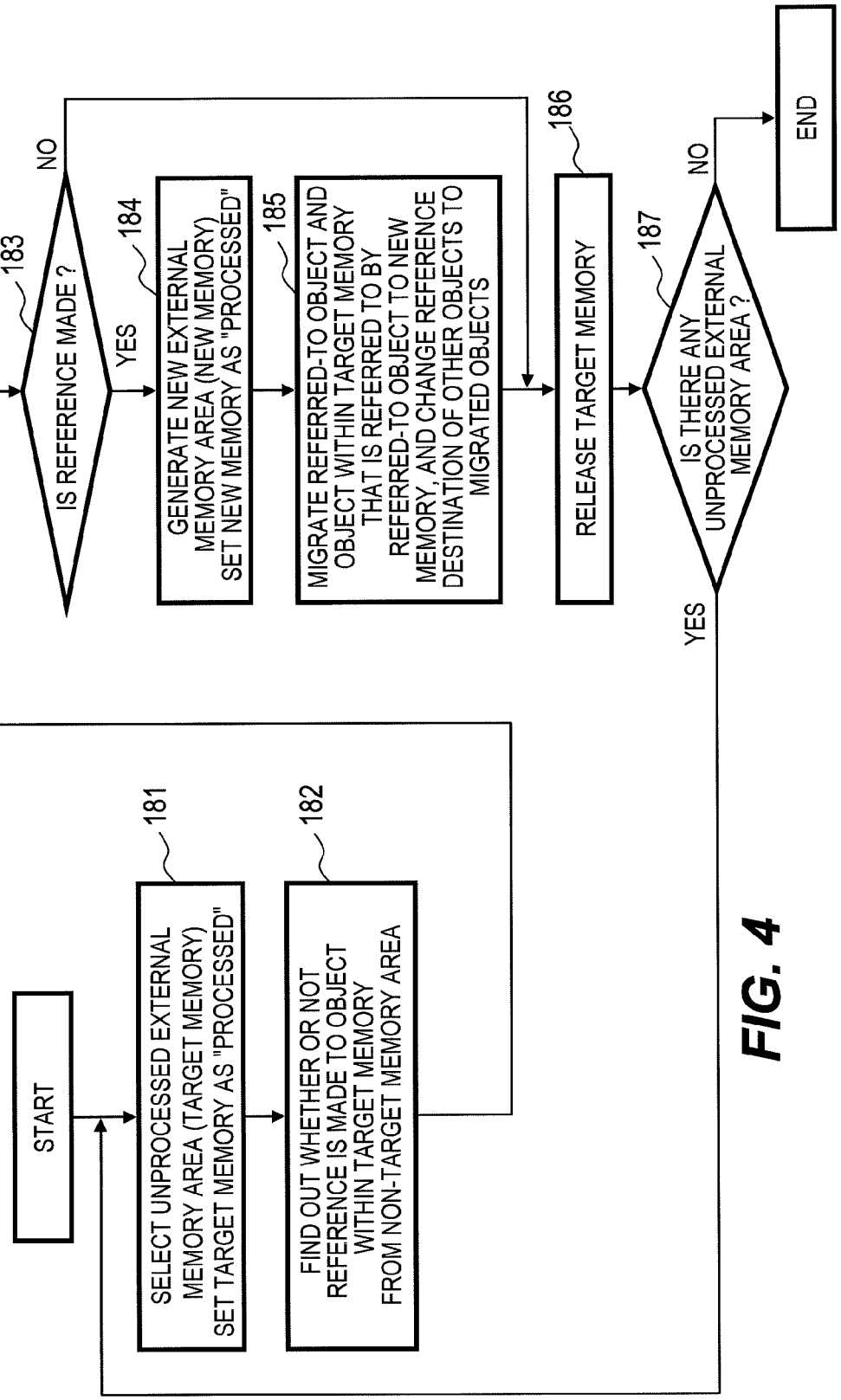
FIG. 4 is a flow chart illustrating an example of processing that is executed by the external memory partial release module according to the first embodiment of this invention.

FIG. 4 is a flow chart illustrating an example of processing that is executed by the external memory partial release module 18. This processing is executed at given timing such as after the garbage collector 13 of the Java virtual machine 10 executes garbage collection or during the execution of the Java program 20.

First, in Step 181, the external memory partial release module 18 selects which external memory area (target memory) 31 is to be processed, and sets the selected memory area 31 as "processed". The external memory partial release module 18 may select a plurality of target external memory areas 31. In Step 182, the external memory partial release module 18 determines whether or not a reference is made to an object within the target external memory area 31 from an object in the external memory area 31 that is not a processing target this time. The determination on a reference to an object in the external memory area 31 can use technology described in paragraphs [0009] to [0014] of JP 2009-037547 A and well-known methods.

Specifically, the external memory partial release module 18 determines whether or not a reference is made to an object within the external memory area 31 that is the current target of the external memory partial release processing from an object within the external memory area 31 that is not the current target of the external memory partial release processing. The external memory partial release module 18 proceeds to Step 184 in the case where a reference is made to an object within the target external memory area 31 from the non-target external memory area 31, and moves to Step 186 in the case where no object is referred to in Step 183.

When it is determined in Step 183 that there is an object referred to, the external memory partial release module 18 allocates a new external memory area (new memory) 31 from the external heap 30 in Step 184. Specifically, the external memory partial release module 18 a new external memory area 31 within the external heap 30 and sets this memory area as "processed".

In Step 185, the external memory partial release module 18 migrates 1) objects determined in Steps 182 and 183 as those referred to from other external memory areas 31 and 2) other objects within the processing target external memory areas 31 that are being referred to by these referred-to objects to the new memory allocated in Step 184. One or more objects can be referred to from other external memory areas or by other objects within the same external memory area.

The external memory partial release module 18 also changes 1) the reference destination of the objects within other external memory areas 31 that refer to these migration target objects and 2) the reference destination of one migration target object that refers to another migration target object to the migrated objects in the new memory 31.

Specifically, in the case where an object within the external memory area 31 that is not the target of the external memory area partial release processing (hereinafter, referred to as non-target object) refers to an object within the external memory area 31 that is the target of the partial release processing (hereinafter, referred to as target object), the external memory partial release module 18 updates the reference destination of the non-target object with the address of the target object migrated to the new memory 31. In the case where there is a reference relation between target objects migrated to the new memory 31, the external memory partial release module 18 updates the reference destination address with an address within the new memory 31.

After a target object referred to by a non-target object (plus, if any, a target object referred to by the referred-to target object) is migrated from the processing target external memory area 31 to the new memory 31 which has newly been allocated, the external memory partial release module 18 releases the processing target external memory area 31 in Step 186. The processing target external memory area 31 is released because the only objects remaining in the processing target external memory area 31 are objects that are not referred to by the non-processing target external memory areas 31.

In Step 187, the external memory partial release module 18 determines whether or not any external memory area 31 is left within the external heap 30 that has not been set as "processed". The external memory partial release module 18 moves to Step 181 when there is an unprocessed external memory area 31, and ends the processing when there is no unprocessed external memory area 31.

In this embodiment, in the case where the external memory area 31 that is the target of the processing by the external memory partial release module 18 contains a target object referred to by a non-target object, a new memory is always allocated and only the target object (plus, if any, a target object referred to by the referred-to target object) is migrated from the processing target external memory area 31 to the new memory. Thereafter, partial release processing of the processing target external memory area 31 is executed. The utilization efficiency of areas in the external heap 30 is improved in this manner.

Figure 5:
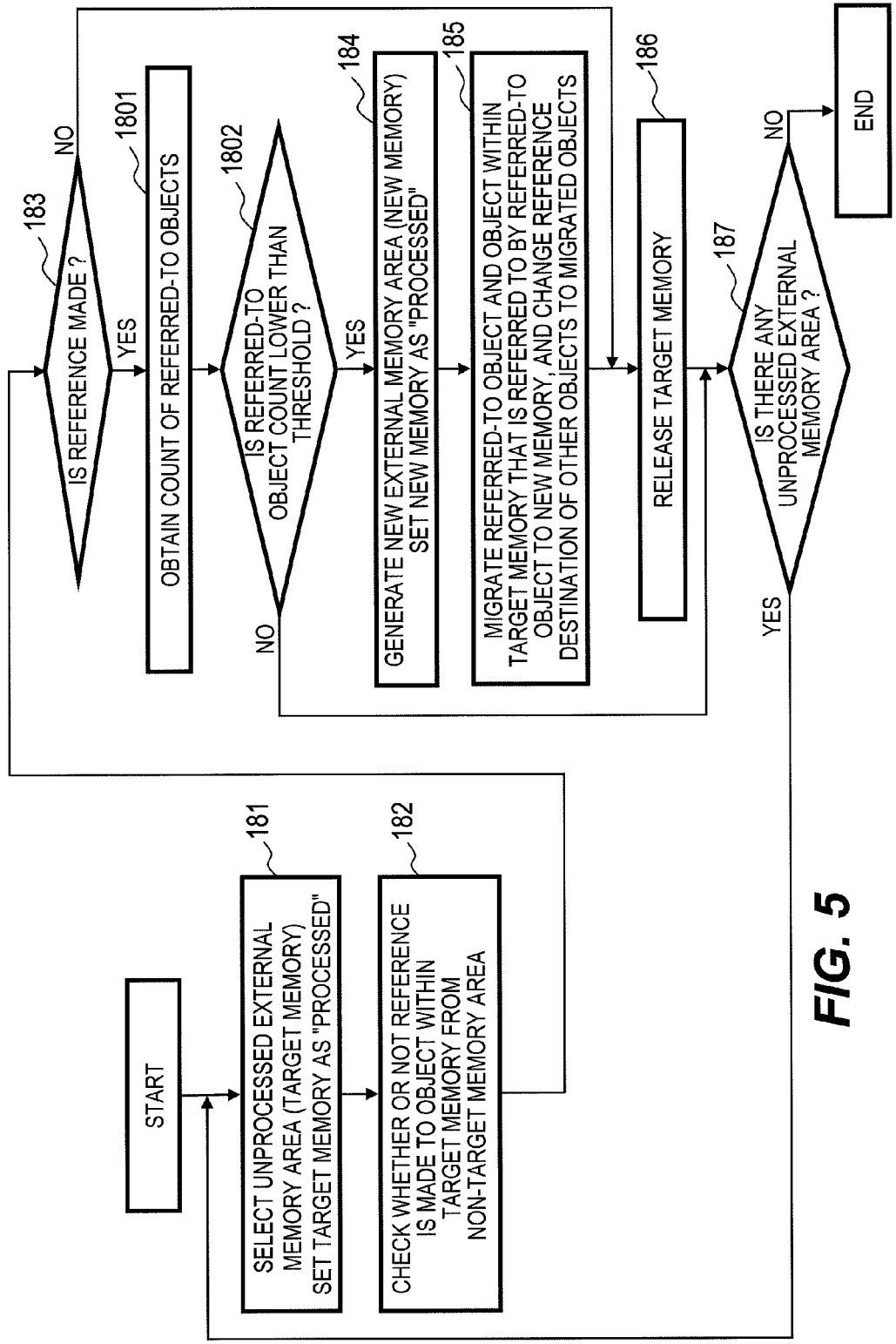
FIG. 5 is a flow chart illustrating a modification example of processing that is executed by the external memory partial release module according to the first embodiment of this invention.

A modification example of the processing of FIG. 4 which is executed by the external memory partial release module 18 is described next. FIG. 5 is a flow chart illustrating the modification example. This flow chart includes, as a condition for executing steps subsequent to Step 184 of FIG. 4, executing the steps subsequent to Step 184 when the count of objects referred to from other external memory areas 31 is lower than a threshold. The rest of FIG. 5 is the same as in FIG. 4.

Steps 181 to 183 are as described above with reference to FIG. 4. In Step 1801, the external memory partial release module 18 searches for target objects referred to by objects within the external memory areas 31 that are not the current processing target, and obtains the count of the referred-to target objects.

In Step 1802, in the case where the count of target objects referred to by non-target objects is lower than a preset threshold th1, the external memory partial release module 18 moves to Step 1804. In the case where the count of target objects referred to by non-target objects is not lower than the threshold th1 in Step 1802, the external memory partial release module 18 moves to Step 187 without executing the partial release processing. Descriptions of Steps 184 and 187 are both already given and therefore omitted here.

When the count of target objects referred to from other external memory areas 31 is found to be lower than the threshold th1 through the processing described above, it means that objects within the current processing target external memory area 31 that the Java program 20 does not plan to use later have increased in number. The external memory area 31 occupied by the objects that are not expected to be put into use can therefore be released to make the most of the external heap 30.

Figure 6:
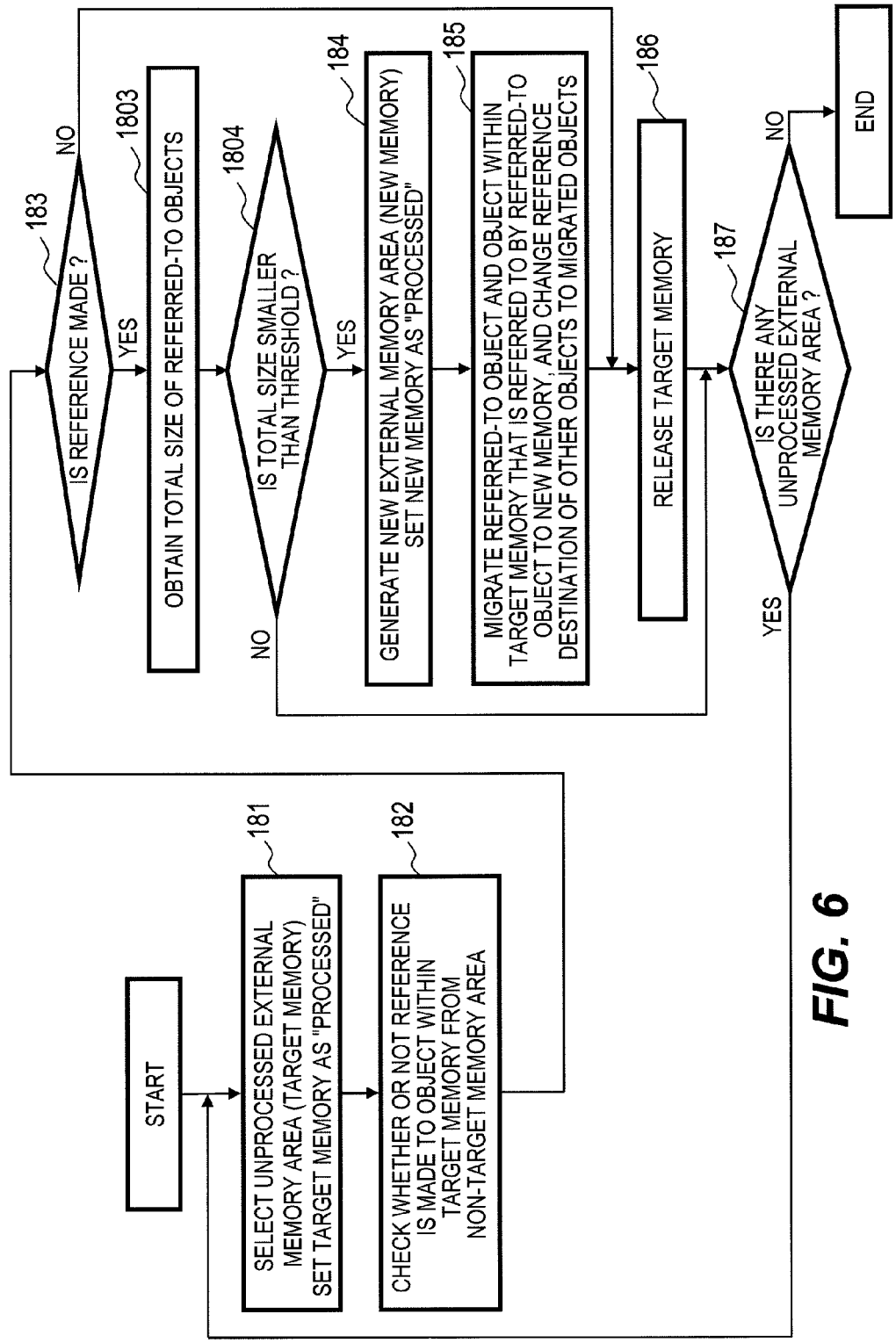
FIG. 6 is a flow chart illustrating an another modification example of processing that is executed by the external memory partial release module according to the first embodiment of this invention.

Another modification example of the processing of FIG. 4 which is executed by the external memory partial release module 18 is described next. FIG. 6 is a flow chart illustrating the modification example. This flow chart includes, as a condition for executing steps subsequent to Step 184 of FIG. 4, executing the steps subsequent to Step 184 when the size of objects referred to from other external memory areas is lower than a threshold. The rest of FIG. 6 is the same as in FIG. 4.

Steps 181 to 183 are as described above with reference to FIG. 4. In Step 1803, the external memory partial release module 18 obtains the combined size of areas in the target external memory area 31 that are occupied by all target objects referred to by objects within the external memory areas 31 that are not the current processing target.

In Step 1804, in the case where the obtained size of the occupied areas is smaller than a preset threshold th2, the external memory partial release module 18 moves to Step 184. In the case where the obtained size of the occupied areas is not lower than the threshold th2 in Step 1804, the external memory partial release module 18 moves to Step 187. Descriptions of Steps 184 and 187 are both already given and therefore omitted here.

When the combined size of target objects referred to from other external memory areas 31 is found to be smaller than the threshold th2 through the processing described above, it means that objects within the current processing target external memory area 31 that the Java program 20 does not plan to use later have increased in capacity. The external memory area 31 occupied by the objects that are not expected to be put into use can therefore be released to make the most of the external heap 30.

Figure 7:
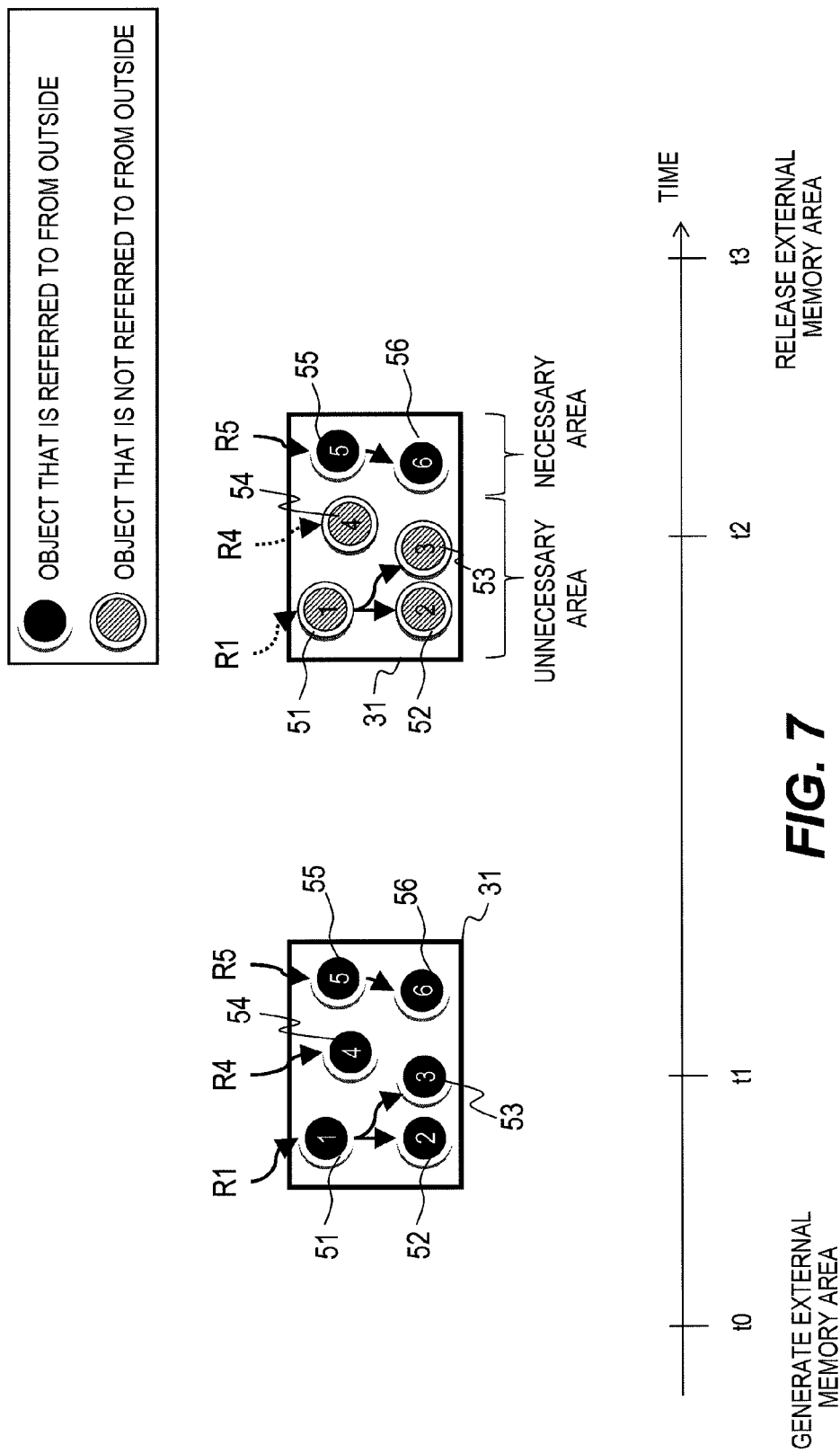
FIG. 7 is an explanatory diagram illustrating an example of transition in the state of the external memory area that occurs through the partial release processing according to the first embodiment of this invention.
Figure 8:
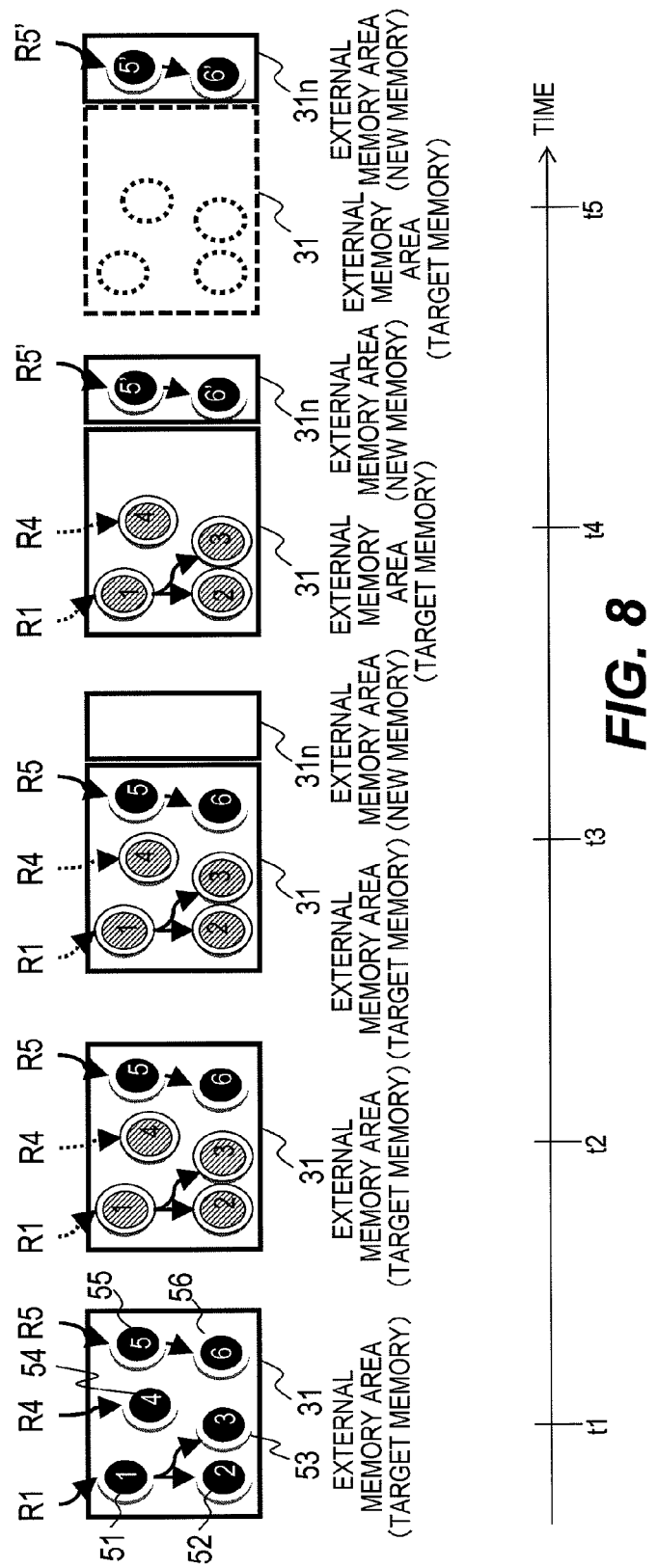
FIG. 8 is an explanatory diagram illustrating detail of an example of transition in the state of the external memory area that occurs through the partial release processing according to the first embodiment of this invention.

FIGS. 7 and 8 illustrate an example of transition in the state of the external memory area 31 that occurs through the partial release processing of FIG. 4. FIG. 7 is an explanatory diagram illustrating a transition in the state of the external memory area 31 that is caused by the partial release processing. FIG. 8 is an explanatory diagram illustrating details of a transition in the state of the external memory area 31 that is caused by the partial release processing.

At a time t0 in FIG. 7, the external memory generating module 15 generates a new external memory 31 in the external heap 30. At a time t1, the external memory data generating module 16 generates a plurality of objects, 1 to 6 (51 to 56 in the drawing), in the new external memory area 31.

At the time t1, the objects 1, 4, and 5 (51, 54, and 55 in the drawing) are referred to from outside the external memory area 31, the object 1 (51 in the drawing) refers to the objects 2 and 3 (52 and 53 in the drawing), and the object 5 (55 in the drawing) refers to the object 6 (56 in the drawing). The objects 1 to 6 are all objects necessary for the execution of the Java program 20. The references to the object 1, the object 4, and the object 5 from outside the external memory area 31 are denoted by R1, R4, and R5, respectively.

As the execution of the Java program 20 progresses, the references R1 and R4 from outside the external memory area 31 cease at a time t2. In the external memory area 31 at this point, the objects 1 and 4 are no longer necessary because the references R1 and R4 have ceased. The objects 2 and 3 referred to by the object 1 are also no longer necessary. The reference R5, on the other hand, still remains, which means that the object 5 and the object 6 referred to by the object 5 are objects necessary for the subsequent execution of the Java program 20.

At the time t2, areas occupied by the objects 1 to 4 are unnecessary areas (see FIG. 7), and areas occupied by the objects 5 and 6 are necessary areas (see FIG. 7). At a point in time (a time t3) subsequent to this point (the time t2), the external memory partial release module 18 starts partial release processing of the external memory area 31.

In Step 181 of FIG. 4, the external memory partial release module 18 selects the external memory area 31 as a processing target at the time t3 of FIGS. 7 and 8. The external memory area 31 selected as a processing target by the external memory partial release module 18 is called a target memory in the following description. In Step 182 of FIG. 4, the external memory partial release module 18 detects, with respect to the objects 1 to 6 within the selected target memory, a reference to the target memory from a non-target memory area. In Step 183 of FIG. 4, the external memory partial release module 18 moves to Step 184 of FIG. 4 because the reference 5 which is a reference from the outside is present.

In Step 184, the external memory partial release module 18 generates a new external memory (new memory) 31n within the external heap 30 as illustrated in a drawing for the time t3 of FIG. 8.

In Step 185 of FIG. 4, as illustrated in a drawing for a time t4 of FIG. 8, the external memory partial release module 18 migrates the object 5, which is the reference destination of the reference R5, and the object 6, which is referred to by the object 5, to the new memory 31n. The migrated objects are respectively denoted by 5' and 6'. An adjustment for accommodating this migration is made in which the reference destination of an external object that uses the reference R5 is changed to the object 5' of the new memory 31n, which is the migration destination. The adjusted reference is denoted by R5'. The reference to the object 6 from the object 5 is also changed to a reference to the object 6' migrated to the new memory 31n.

Executing this processing puts the target memory 31 into a state at the time t4 of FIG. 8. The other objects than the object 5', which is referred to in the reference R5', and the object 6' remain in the target memory 31.

Release of the target memory 31 in Step 186 of FIG. 4 puts the target memory 31 in a state at a time t5 of FIG. 8. With the release of the target memory 31, the objects 1 to 4 which have not migrated to the new memory 31n are deleted. The external memory 31 containing the objects 1 to 4 which are not expected to be put into use later in the external heap 30 is thus released to enhance the utilization efficiency of the external heap 30.

This embodiment has been described taking as an example the execution by the Java virtual machine 10. However, the method of this invention is applicable not only to the Java virtual machine 10 but also to a program processing system capable of object management. This embodiment also deals with as an example a reference to one external memory area 31 from another external memory area 31, but objects referred to by the Java program 20 may be included as well.

As described, in the first embodiment, whether data within one of the external memory areas 31 managed by a program that has been allocated is necessary or not is determined, an area occupied by unnecessary data is released to delete the external memory area 31 that is unnecessary, and objects necessary for the execution of the Java program 20 are migrated to the external memory area 31 that is newly allocated. The utilization efficiency of the external heap 30 is improved in this manner.

The external memory partial release processing may be executed, in addition to after the execution of garbage collection by the garbage collector 13 and during the execution of the Java program 20, when it is found as a result of monitoring for unnecessary areas in the external heap 30 that the size of unnecessary areas or the count of objects has exceeded a preset threshold. Processing of monitoring for unnecessary areas in the external heap 30 can be, for example, the processing of finding unnecessary areas from a reference relation between objects described above which is executed by the external heap processing module 14.

Instead of Steps 1803 and 1804, the steps subsequent to Step 184 of FIG. 4 may be executed when the total size of areas in the external heap 30 that are occupied by the external memory areas 31 exceeds a preset threshold th3. When the total size of areas occupied by the external memory areas 31 exceeds the preset threshold th3, there is a possibility that the Java program 20 has generated a large number of external memory areas 31 in the external heap 30, and the function of the external memory partial release module 18 may be used for the purpose of increasing areas that the external heap 30 can provide to the Java program 20.

Instead of Steps 1803 and 1804, the steps subsequent to Step 184 of FIG. 4 may also be executed when the count of the external memory areas 31 that are newly allocated in the external heap 30 (new memories) exceeds a preset threshold th4. When the count of new memories exceeds the preset threshold th4, it can be determined that the external memory partial release module 18 has functioned repeatedly, and the function of the external memory partial release module 18 may be used for the purpose of increasing areas that the external heap 30 can provide to the Java program 20.

Second Embodiment

Figure 9:
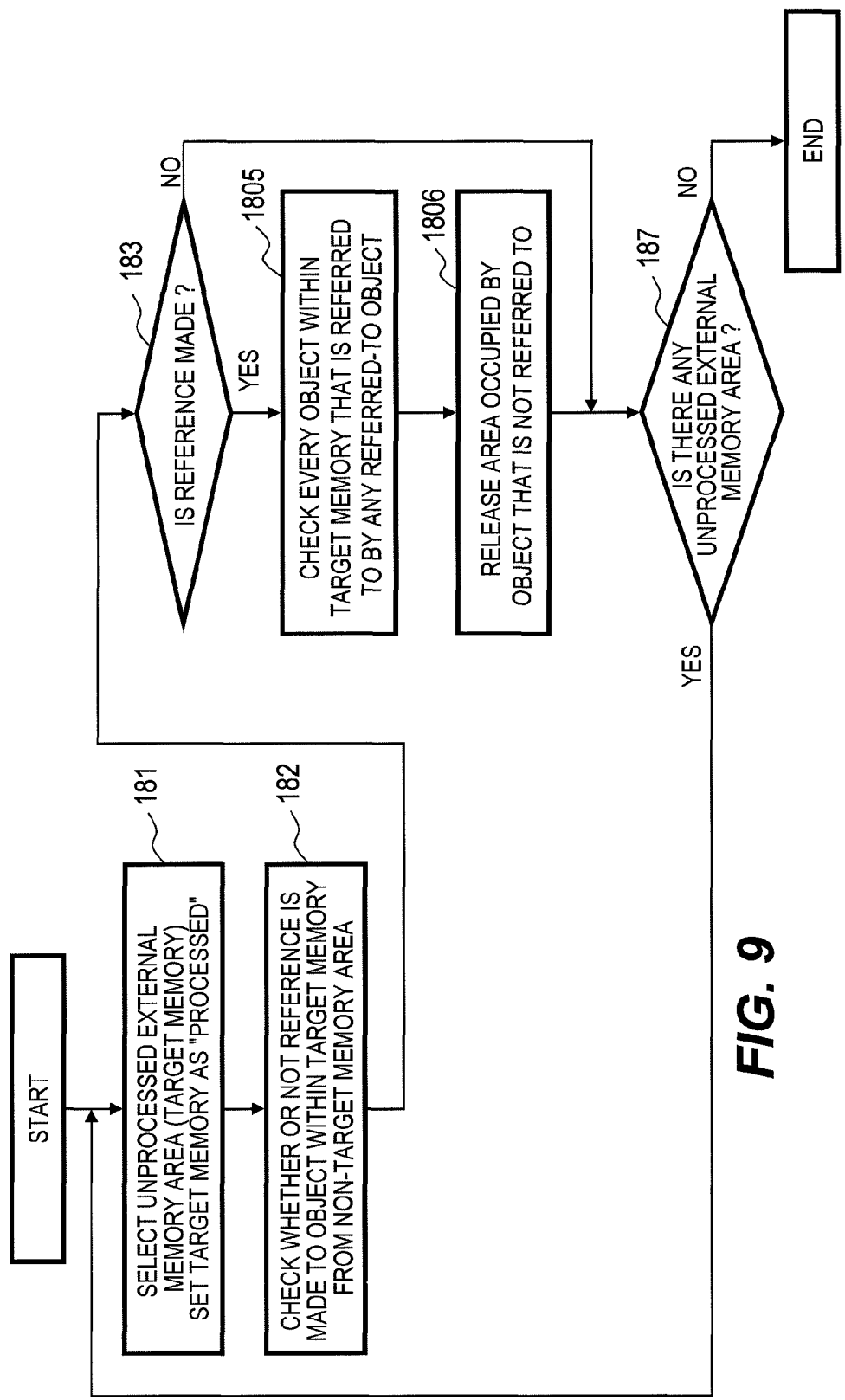
FIG. 9 is a flow chart illustrating an example of processing that is executed by the external memory partial release module according to a second embodiment of this invention.

FIG. 9 is a flow chart illustrating processing that is executed by the external memory partial release module 18 according to a second embodiment of this invention. The processing of FIG. 9 is a modification to a part of the processing of the first embodiment described with reference to FIG. 4. The rest of FIG. 9 is the same as in the first embodiment.

In the second embodiment, in the case where a command for utilizing the external heap 30 is written in the Java program 20, which is executed by the Java virtual machine 10, the Java virtual machine 10 executes the processing of the external memory partial release module 18, releases only an area occupied by data (an object) that is unnecessary for the subsequent execution of the program, and thereby shrinks the external memory area 31.

The processing of FIG. 9 is performed after the execution of garbage collection by the Java virtual machine 10, during the execution of the program, or the like.

Steps 181 to 183 are the same as in the first embodiment described with reference to FIG. 4. In Step 1805, the external memory partial release module 18 searches all objects within the processing target external memory area 31 for those referred to by objects within other external memory areas 31 and those referred to by objects within the same external memory area (target memory) 31.

In Step 1806, objects within the target memory that are not the objects detected in Step 1805 are extracted. The extracted objects are objects that are not referred to by other objects, and are not expected to be put into use in the subsequent execution of the Java program 20. The external memory partial release module 18 therefore releases areas occupied by objects within the target external memory area 31 that are not referred to by any objects to thereby shrink the external memory area 31, and then moves to Step 187. A description on Step 187 has been given in the first embodiment with reference to FIG. 4, and is therefore omitted here.

The external memory partial release module 18 may execute Step 1806 when the count of objects obtained in Step 1805 of FIG. 9, namely, the count of objects within the target memory that are referred to by other objects, is lower than a threshold. Processing executed in this case is illustrated in FIG. 10.

Figure 10:
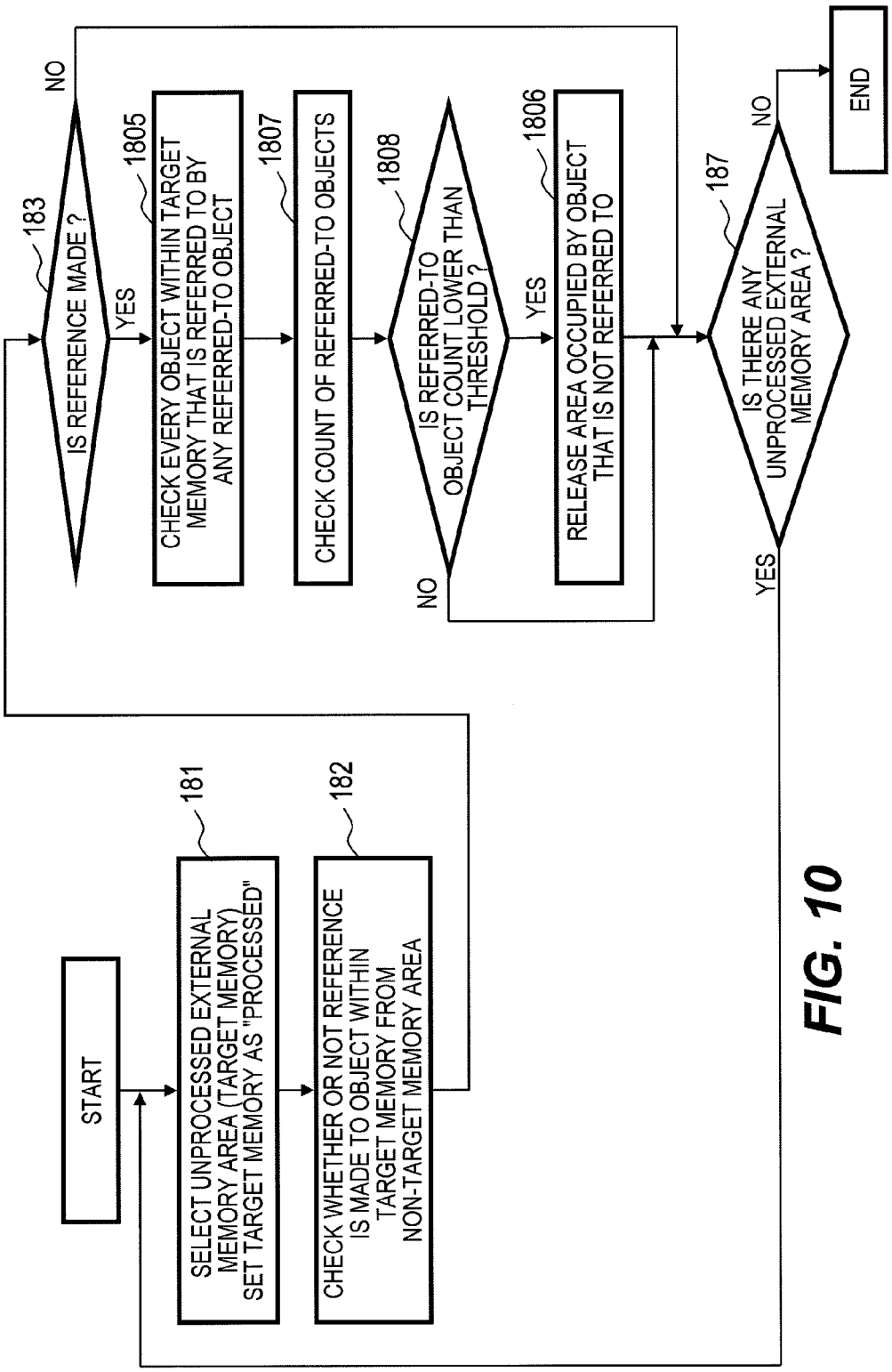
FIG. 10 is a flow chart illustrating a modification example of processing that is executed by the external memory partial release module according to the second embodiment of this invention.

FIG. 10 is a flow chart illustrating another example of the processing that is executed by the external memory partial release module 18 according to the second embodiment of this invention.

Steps 181 to 183 and Step 1805 are as described above. In Step 1807, the external memory partial release module 18 checks the count of objects referred to by other objects and obtains the count. In Step 1808, the external memory partial release module 18 moves to Step 1806 in the case where the count of referred-to objects is lower than the threshold th1, and moves to Step 187 in the case where the count of referred-to objects is not lower than the threshold th1. Descriptions of Steps 1806 and 187 are already given and therefore omitted here.

When the count of target objects that are referred to from other external memory areas 31 or by objects within the same external memory area 31 is found to be lower than the threshold th1 through the processing described above, it means that objects within the current processing target external memory area 31 that the Java program 20 does not plan to use later have increased in number. The external memory partial release module 18 can therefore release only areas within the external memory area 31 occupied by objects that are not expected to be put into use, to thereby shrink the external memory area 31 and make the most of the external heap 30.

The external memory partial release module 18 may execute Step 1806 when the size of areas occupied by objects obtained in Step 1805 of FIG. 9, namely, the size of areas occupied by objects within the target memory that are referred to by other objects, is lower than a threshold th2. Processing executed in this case is illustrated in FIG. 11.

Figure 11:
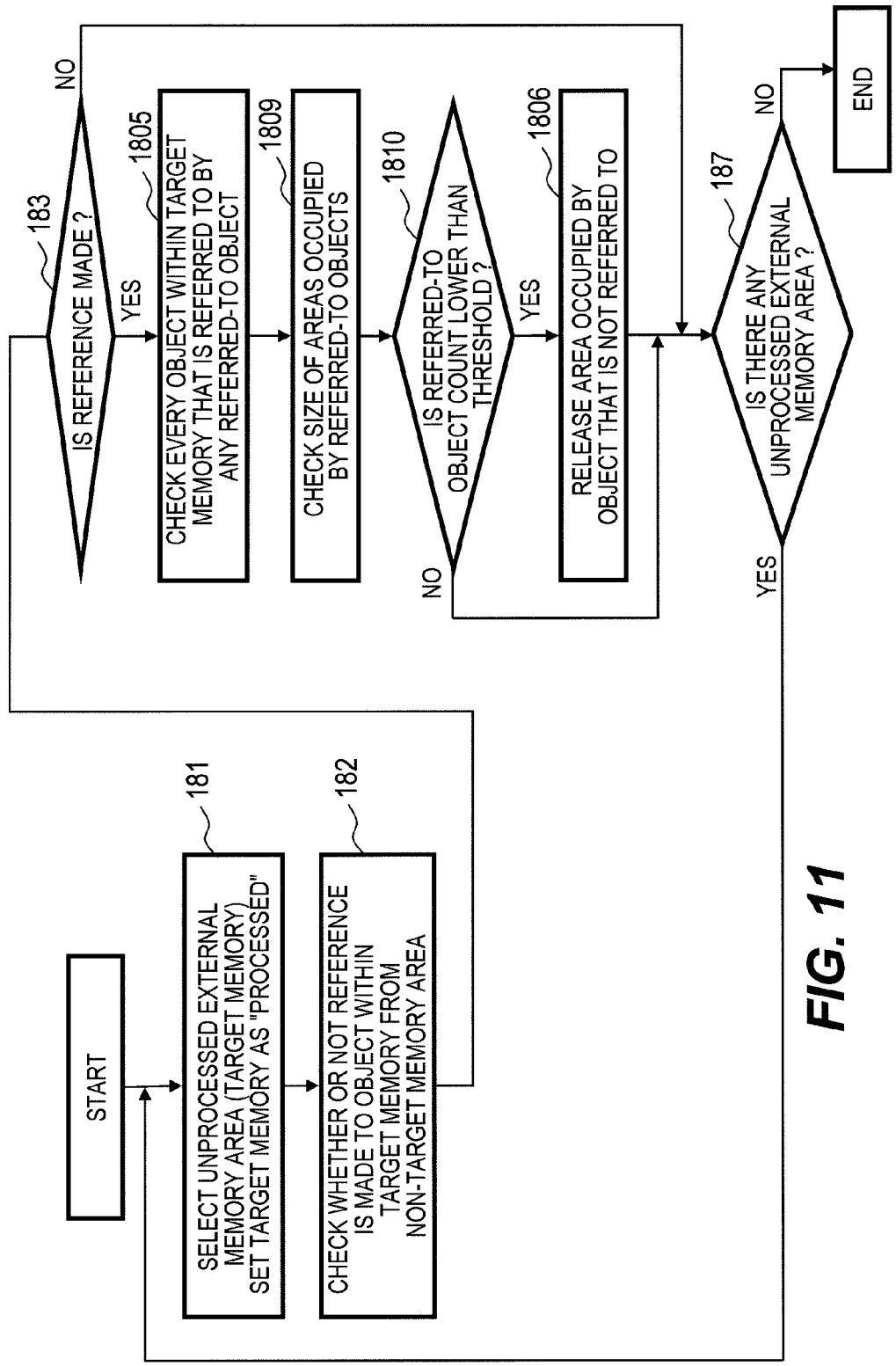
FIG. 11 is a flow chart illustrating an another modification example of processing that is executed by the external memory partial release module according to the second embodiment of this invention.

FIG. 11 is a flow chart illustrating still another example of the processing that is executed by the external memory partial release module 18 according to the second embodiment of this invention.

In FIG. 11, Steps 181 to 183 and Step 1805 are as described above. In Step 1809, the external memory partial release module 18 checks the size of areas occupied by objects referred to by other objects and obtains the size. In Step 1810, the external memory partial release module 18 moves to Step 1806 in the case where the size of areas occupied by referred-to objects is lower than the threshold th2, and moves to Step 187 in the case where the size of areas occupied by referred-to objects is not lower than the threshold th2. Descriptions of Steps 1806 and 187 are already given and therefore omitted here.

When the size of target objects that are referred to from other external memory areas 31 or the same external memory area 31 is found to be lower than the threshold th2 through the processing described above, it means that objects within the current processing target external memory area 31 that the Java program 20 does not plan to use later have increased in capacity. The external memory partial release module 18 can therefore release only areas within the external memory area 31 that are not expected to be put into use, to thereby shrink the external memory area 31 and make the most of the external heap 30.

Figure 12:
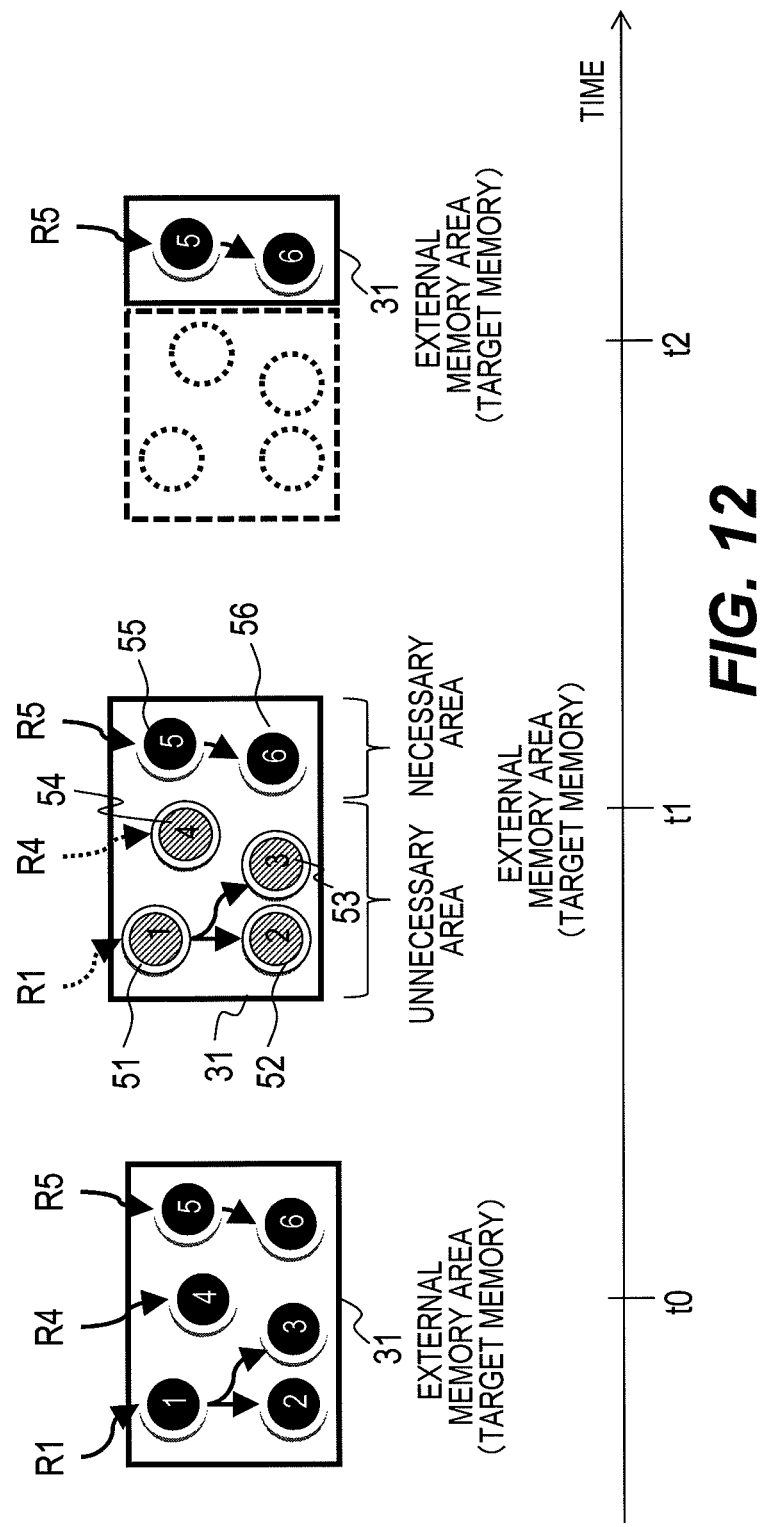
FIG. 12 is an explanatory diagram illustrating an example of transition in the state of the external memory area that occurs upon using the external heap according to the second embodiment of this invention.

FIG. 12 illustrates an example of transition in the state of the external memory area 31 that occurs through the processing of FIGS. 9 to 11. At a time t0 in FIG. 12, a plurality of objects, 1 to 6 (51 to 56), is generated in the external memory area 31. The objects 1, 4, and 5 are referred to from outside the external memory area 31 (R1, R4, and R5). The object 1 refers to the objects 2 and 3, and the object 5 refers to the object 6. The objects 1 to 6 are all objects necessary for the execution of the Java program 20.

As the execution of the Java program 20 progresses, the references R1 and R4 from outside the external memory area 31 cease at the time t1. The external memory partial release module 18 executes partial release processing of the external memory area 31 in this state. In Step 181 of FIG. 9 described above, the external memory partial release module 18 selects the external memory area 31 illustrated in FIG. 12 (this external memory area is called a target memory).

In Step 182, the external memory partial release module 18 finds out whether or not a reference is made from a non-target memory area. The external memory partial release module 18 determines in Step 183 that the reference R5 is present at the time t1 as illustrated in FIG. 12, and the processing therefore moves to Step 1805. In Step 1805, the external memory partial release module 18 determines whether or not a reference is made to an object within the target memory from the object 5, which is the reference destination in the reference R5. The object 6 is determined as the reference destination of the object 5, and the other objects (the objects 1 to 4) are determined as objects that are not referred to.

In Step 1806, the external memory partial release module 18 releases only areas occupied by objects within the target memory that are not referred to by other objects (areas occupied by the objects 1 to 4) to shrink the external memory area 31 at the time t2. The external memory area 31 at this point is in a state at the time t2 of FIG. 12. The only objects remaining in the partial release processing target memory are the object 5, which is referred to from a non-target memory area, and the object 6, which is referred to by the object 5, and areas that have been occupied by the other objects than the objects 5 and 6 (unnecessary areas) are released. The utilization efficiency of the external memory area 31 is consequently enhanced.

As described, in the second embodiment, whether data within one of the external memory areas 31 managed by a program that has been allocated is necessary or not is determined, only an area occupied by unnecessary data is released to delete an unnecessary area within the external memory area 31. The utilization efficiency of the external heap 30 is improved in this manner.

Instead of Steps 1803 and 1804, the external memory partial release module 18 may execute Step 1806 of FIG. 10 or 11 when the total size of areas in the external heap 30 that are occupied by the external memory areas 31 exceeds the preset threshold th3.

This invention has been described above in detail with reference to the accompanying drawings. However, this invention is not limited to these concrete configurations, and includes various modifications and equivalent configurations that are within the spirit of the scope of claims set forth below.

For instance, the external memory partial release module 18 may use a condition for starting the partial release processing of the second embodiment in the first embodiment. Specifically, in the first embodiment, whether to start partial release processing is determined based on, for example, the count or data size of all objects within the target memory that are referred to by other objects.

The opposite also applies and a condition for starting the partial release processing of the first embodiment may be used in the second embodiment. For instance, the second embodiment may use the count of new memories as a basis for the determination. Alternatively, the second embodiment may use as a basis for the determination the count or total size of objects that are referred to from non-target external areas. The first embodiment and the second embodiment may use as a basis for the determination the count of areas occupied by the external memory areas 31 or the total size of new memories, depending on the design.

As described, this invention is applicable to memory management in processing that uses an external heap.

What is claimed is:

1. A memory management method for releasing an unnecessary area in a memory area used by a program that is stored in the memory and executed by the computing device in a computer system having a computing device and a memory, the memory management method including the steps of:
   setting, by the computing device, in the memory, a first memory area which is used to execute the program;
   setting, by the computing device, in the memory, a second memory area which can be operated by the program;
   setting, by the computing device, a utilized area in the second memory area based on an instruction from the program;
   storing, by the computing device, objects including data in the utilized area of the second memory area based on an instruction from the program;
   determining, by the computing device, whether the program uses the objects stored in the utilized area within the second memory area; and
   releasing, by the computing device, the utilized area occupied by an object that is not used by the program among the objects stored in the utilized area, wherein releasing the utilized area by the computing device includes the steps of:
   generating a new utilized area in the second memory area;
   migrating an object that is used by the program to the new utilized area from the utilized area where the object that is not used by the program is present; and
   releasing the utilized area where the object that is not used by the program is present.

2. The memory management method according to claim 1, wherein the release of the utilized area by the computing device includes the step of releasing the utilized area occupied by the object that is not used by the program when the utilized area satisfies a condition set in advance.

3. The memory management method according to claim 2, wherein the condition set in advance is that one of a count or size of objects within the utilized area that are not used by the program exceeds a preset threshold.

4. The memory management method according to claim 2, wherein the condition set in advance is that a total size that all utilized areas occupy in the second memory area exceeds a preset threshold.

5. The memory management method according to claim 1, wherein the release of the utilized area by the computing device includes the step of releasing the utilized area occupied by the object that is not used by the program when the utilized area satisfies a condition set in advance.

6. The memory management method according to claim 5, wherein the condition set in advance is that one of a count or size of objects within the utilized area that are not used by the program exceeds a preset threshold.

7. The memory management method according to claim 5, wherein the condition set in advance is that a total size that all utilized areas occupy in the second memory area exceeds a preset threshold.

8. The memory management method according to claim 1, wherein the release of the utilized area by the computing device includes the step of releasing the utilized area occupied by the object that is not used by the program when a count of new utilized areas generated in the second memory area exceeds a preset threshold.

9. A memory management method for releasing an unnecessary area in a memory area used by a program that is stored in the memory and executed by the computing device in a computer system having a computing device and a memory, the memory management method including the steps of:
   setting, by the computing device, in the memory, a first memory area which is used to execute the program;
   setting, by the computing device, in the memory, a second memory area which can be operated by the program;
   setting, by the computing device, a utilized area in the second memory area based on an instruction from the program;
   storing, by the computing device, objects including data in the utilized area of the second memory area based on an instruction from the program;
   determining, by the computing device, whether the program uses the objects stored in the utilized area within the second memory area; and
   releasing, by the computing device, the utilized area occupied by an object that is not used by the program among the objects stored in the utilized area, wherein the release of the utilized area by the computing device includes the steps of releasing an area occupied by the object that is not used by the program within the utilized area, and shrinking the utilized area to an area occupied by an object that is used by the program.

10. The memory management method according to claim 9, wherein the release of the utilized area by the computing device includes the step of releasing the utilized area occupied by the object that is not used by the program when the utilized area satisfies a condition set in advance.

11. The memory management method according to claim 10, wherein the condition set in advance is that one of a count or size of objects within the utilized area that are not used by the program exceeds a preset threshold.

12. The memory management method according to claim 10, wherein the condition set in advance is that a total size that all utilized areas occupy in the second memory area exceeds a preset threshold.

13. A computer-readable non-transitory data storage medium, containing a program for controlling a computer,
the computer including a memory, which stores a program, and a computing device, which executes the program stored in the memory,
the program controlling the computing device to execute:
setting, in the memory, a first memory area which is used to execute the program;
setting, in the memory, a second memory area which can be operated by the program;
setting a utilized area in the second memory area based on an instruction from the program;
storing objects including data in the utilized area of the second memory area based on an instruction from the program;
determining whether the program uses the objects stored in the utilized area within the second memory area; and
releasing the utilized area occupied by an object that is not used by the program among the objects stored in the utilized area, wherein releasing the utilized area by the computing device includes the steps of:
generating a new utilized area in the second memory area;
migrating an object that is used by the program to the new utilized area from the utilized area where the object that is not used by the program is present; and
releasing the utilized area where the object that is not used by the program is present.

14. A computer system comprising a computing device and a memory configured to execute a program and release an unnecessary area in a memory area that is used by the program,
the computer system comprising:
a processor configured to operate a management module to set, in the memory, a first memory area, in which the processor executes the program; and
the processor configured to operate an external heap processing module to set, in the memory, a second memory area,
wherein the external heap processing module comprises:
an external memory generating module configured to set, in the second memory area, a utilized area;
a data generating module configured to store objects including data in the utilized area of the second memory area; and
a partial release module configured to determine whether or not the program uses the objects stored in the utilized area within the second memory area, and configured to release the utilized area occupied by an object that is not used by the program among the objects stored in the utilized area, wherein the computing device is further configured to:
generate a new utilized area in the second memory area;
migrate an object that is used by the program to the new utilized area from the utilized area where the object that is not used by the program is present; and
release the utilized area where the object that is not used by the program is present.

* * * * *